(12) United States Patent
Eftring

(10) Patent No.: US 7,288,302 B2
(45) Date of Patent: Oct. 30, 2007

(54) PACKAGING LAMINATE AND PACKAGING CONTAINERS PRODUCED THEREFROM

(75) Inventor: Ann Eftring, Torna-Hällestad (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 5 days.

(21) Appl. No.: 10/344,933

(22) PCT Filed: Aug. 23, 2001

(86) PCT No.: PCT/SE01/01794

§ 371 (c)(1),
(2), (4) Date: Jun. 12, 2003

(87) PCT Pub. No.: WO02/18226

PCT Pub. Date: Mar. 7, 2002

(65) Prior Publication Data

US 2004/0028850 A1   Feb. 12, 2004

(30) Foreign Application Priority Data

Aug. 28, 2000  (SE) .................... 0003029

(51) Int. Cl.
 B29D 22/00 (2006.01)
 B29D 23/00 (2006.01)
 B32B 1/08 (2006.01)
(52) U.S. Cl. ............... 428/34.2; 428/36.91; 428/35.7; 428/500; 229/106; 229/138
(58) Field of Classification Search ............ 428/34.2, 428/35.7, 34.3, 36.91, 36.9, 500; 229/106, 229/138
See application file for complete search history.

(56) References Cited

U.S. PATENT DOCUMENTS

| 3,539,437 | A |   | 11/1970 | Kirk et al. |
| 4,513,036 | A | * | 4/1985 | Thompson et al. ...... 206/524.6 |
| 4,706,874 | A | * | 11/1987 | Reil ......................... 222/526 |
| 4,879,147 | A |   | 11/1989 | Newman et al. |
| 5,204,179 | A | * | 4/1993 | Baker et al. ................ 428/336 |
| 6,394,339 | B1 | * | 5/2002 | Giblin .................. 229/125.14 |

FOREIGN PATENT DOCUMENTS

| DE | 4311422 A1 | 10/1994 |
| DE | 19859334 A1 | 7/2000 |
| EP | 0494595 A1 | 7/1992 |
| EP | 0622306 A1 | 11/1994 |
| JP | 06-340036 A | * 12/1994 |
| JP | 6340036 | 12/1994 |
| JP | 11309816 | 11/1999 |
| WO | WO97/13637 | 4/1997 |
| WO | WO 00/53417 | 9/2000 |

* cited by examiner

Primary Examiner—Michael C. Miggins
(74) Attorney, Agent, or Firm—Buchanan, Ingersoll & Rooney PC

(57) ABSTRACT

The disclosure relates to a packaging laminate and packaging containers for liquid foods produced therefrom. The packaging laminate (10) includes a paper or paperboard layer (11) and outer, liquid-tight coatings (13 and 14) on both sides of the paper or paperboard layer (11). In order to impart to the packaging laminate (10) increased rigidity and thereby make for the production of packaging containers with improved gripping properties, the packaging laminate (10) has an additional layer (12) of mineral-filled polyolefin between the paper or paperboard layer (11) and one of the two outer, liquid-tight coatings (14).

8 Claims, 2 Drawing Sheets

PACKAGING LAMINATE AND PACKAGING CONTAINERS PRODUCED THEREFROM

FIELD OF THE INVENTION

The present invention relates to a packaging laminate comprising a core layer of paper or paperboard, for producing a packaging container for liquid foods. The present invention also relates to a packaging container produced from the packaging laminate.

BACKGROUND OF THE INVENTION

In the packaging industry, use is often made of packaging containers of single-use disposable type for transporting liquid foods such as, for example, milk and juice, and a very large group of these so-called single-use packages is produced from a packaging laminate consisting of a core layer of paper or paperboard and outer, liquid-tight coatings of plastic, usually polyethylene, on both sides of the core layer. A conventional single-use package for, for example milk, is often produced from a packaging laminate which has a rigid, but foldable core layer of paper or paperboard and outer, liquid-tight coatings of plastic, preferably polyethylene, on both sides of the core layer. Such a single-use package has sufficient mechanical strength and stability to withstand external stresses to which the packaging container is exposed during normal transport and handling, at the same time as being sufficiently liquid-tight to efficiently prevent the packed liquid food from penetrating into the liquid-sensitive paper or paperboard layer.

A single-use package produced from a packaging laminate which only consists of paper or paperboard and outer, liquid-tight coatings of polyethylene as the single-use package described above has, however, no—or but insignificant—tightness properties against gases and cannot, therefore, be employed for packaging, for example, juice and cooking oil which are very rapidly broken down and destroyed in contact with oxygen gas. In order to impart to the single-use package sufficient tightness properties against gases, in particular oxygen gas, so that oxygen gas-sensitive products may also be packed and stored in it, the conventional packaging laminate is supplemented with at least one additional material layer possessing the requisite gas barrier properties.

Examples of such materials may be both organic materials and inorganic materials, but are normally an aluminium foil (Alifoil) between the core layer and the outer, liquid-tight plastic coating on the inside of the single-use package. An aluminium foil is practically entirely gas-tight and, in addition, enjoys the major advantage over, for instance, other organic barrier polymers, for example hydrolysed ethylene vinyl acetate copolymer (so-called EVOH), that it makes for simple, but rapid and efficient thermosealing of the packaging laminate by induction thermosealing. As was mentioned above, there has long been in existence a very large and constantly growing number of commercial single-use packages of varying sizes and shapes for liquid foods. A very well known example is the parallelepipedic single-use package which is sold under the trademark Tetra Brik® and which is most often employed for liquid foods of the type such as milk, juice etc. A Tetra Brik® package has a tubular container body of rectangular cross section and united, substantially planar end closures with four double-walled, triangular corner flaps folded down and fixedly sealed against adjacent outer walls on the outside of the package. Another well-known example of a commercial single-use package for liquid foods is the single-use package sold under the trademark Tetra Rex®. This package has a tubular container body of square cross section and a substantially planar bottom closure and gable-top closure in one piece with the tubular container body. Yet a further example of a well-known commercial single-use package for liquid foods is the package which is sold under the trademark Tetra Top® and which, like both of the previously mentioned single-use packages, has a tubular container body and a substantially planar bottom closure in one piece with the tubular container body. A Tetra Top® package differs from the two previously mentioned packages principally in that the tubular container body is of substantially circular cross section and that the top closure of the package consists of an injection moulded plastic lid with a peripheral, annular downwardly directed flange by means of which the plastic lid is fixedly sealed in liquid-tight fashion to the inside of the tubular container body.

Single-use packages of the types described above are most generally produced using modem filling machines which, from a web or from prefabricated blanks of a packaging laminate, form, fill and seal finished consumer packages in accordance with the so-called form/fill/seal technology.

From a sheet or web-shaped packaging laminate consisting of a core layer of paper or paperboard and outer, liquid-tight coatings of plastic, preferably polyethylene, mechanically strong and dimensionally stable single-use packages are thus produced with requisite physical tightness properties vis-à-vis both liquids and gases, in particular oxygen gas, in order to make for reliable transport and storage of the packed liquid food.

While the above-described, known packaging laminate consisting of a core layer of paper or paperboard and outer, liquid-tight coatings of plastic, preferably polyethylene, makes for reliable transport and storage of the packed food, it occasionally happens that problems may arise when the package, on being emptied, is grasped and lifted with one hand gripping around at least a part of the tubular container body of the package. More precisely, it has proved that the gripping force to which the package is subjected when it is grasped and lifted on being emptied occasionally needs to be so great that it is even greater than the mechanical gripping rigidity of the package, whereby the package, under the action of the applied gripping force, tends to buckle inwards into the package, with consequential accidental pouring and spilling of the contents, because of the reduction in volume caused thereby.

The problem with unintentional spilling on the emptying of the package may be perceived as more or less troublesome and irritating for the consumer, but becomes more manifest the greater the packed liquid volume is, since a package containing a large liquid volume is heavier than a package containing a slight liquid volume and therefore requires a correspondingly greater manual gripping force in order to be capable of being lifted when the contents of the package are poured out. The problem is also partly linked to the geometric configuration of the package and its dimensions, and may be particularly manifest if the package has a tubular container body with very large ratio between the length of the container body and the diameter of the container body or smallest cross-sectional dimension. However, this problem may be particularly troublesome and irritating in connection with a single-use package which has a tubular container body without vertical, rigidifying folding-or corner edges which extend all the way between the bottom and top closures of the package.

An earlier attempt to solve the above-described problem in connection with the conventional single-use packages has taken as its point of departure to increase the rigidity of the packaging laminate by increasing the thickness of the paper or paperboard layer employed. A paper or paperboard layer with increased thickness however makes the packaging laminate excessively thick and thereby unnecessarily difficult to fold-form, in particular in the regions where overlapping material layers are to be folded double, as is almost always the case when the packaging laminate is reformed into finished single-use packages. Moreover, the material cost for paper or paperboard is extremely high, and an increased paper or paperboard thickness would thus entail a relatively steeply increased material cost for the packaging laminate.

Another earlier attempt to solve the above-described problem has further taken as its point of departure to increase the rigidity of the packaging laminate with the aid of an additional layer of an aluminium foil on the one side of the paper or paperboard web, but this solution also entails steeply increased costs for the packaging laminate because of the extremely high manufacturing and material costs of the aluminium foil. Furthermore, an aluminium foil has a very low level of ductility and stretching and, as a result, cracks very easily when exposed to powerful tensile and flexural stresses, which occur during the reforming of the packaging laminate into packages, in particular in areas where overlapping parts of the packaging laminate are to be folded double.

There is thus still a need in the art for a simple and cost-efficient method of solving the above-described problem in connection with the conventional single-use packages.

SUMMARY OF THE INVENTION

One object of the present invention is therefore to obviate or at least considerably reduce the above-outlined emptying problem in connection with the prior art fibre-based single-use packages for liquid foods.

A further object of the present invention is to realise a packaging laminate of the type described by way of introduction for a dimensionally stable, fibre-based single-use package possessing superior gripping properties and superior emptying properties without consequentially excessively increasing the material costs for the packaging laminate.

One particular object of the present invention is to provide a packaging laminate comprising a core layer of paper or paperboard for a single-use package which has a tubular container body without vertical rigidifying folding- or corner edges which extend all the way between the top and bottom closures of the package.

These and other objects and advantages will be attained according to the present invention by means of a packaging laminate which has characterising features as described herein, and with a single-use package which has characterising features as described herein. Advantageous practical embodiments of the packaging laminate and the single-use package according to the present invention have further been given the characterising features as described herein.

In a first aspect of the present invention, there will thus be provided a packaging laminate which, for the purposes of increasing rigidity, includes a layer of mineral-filled polyolefin which is applied on one side of the paper or paperboard layer and in which the percentage weight proportion of mineral particles constitutes between 40 and 70% of the total weight of the mineral-filled layer.

A packaging laminate comprising a core layer of paper or paperboard and a layer of mineral-filled polyolefin enjoys major advantages over the above-described prior art packaging laminates.

A packaging laminate according to the present invention requires neither complicated equipment nor complicated processes for its production, but may be produced in a simple manner employing existing process equipment.

The packaging laminate according to the present invention further enjoys major cost advantages in comparison with the prior art packaging laminates, since a layer of mineral-filled polyolefin per se is relatively economical and only entails a relatively slight cost increase in comparison with, for example, a packaging laminate which has an aluminium foil or which displays a paper or paperboard layer of increased thickness.

The packaging laminate according to the present invention also enjoys the advantage, as compared with the prior art packaging laminates, that it may readily be reformed into dimensionally stable, liquid-tight single-use packages with improved gripping rigidity and gripping properties without the risk of crack formation and other untightnesses which not seldom may occur in connection with the reforming of certain of the prior art packaging laminates, in particular a packaging laminate which has a tension-sensitive aluminium foil or a packaging laminate which has a paper or paperboard layer of increased thickness.

In addition, a layer of mineral-filled polyolefin has certain tightness properties against humidity and gases, in particular oxygen gas, and therefore contributes in imparting to the packaging laminate according to the invention increased humidity and gas barrier properties.

In another aspect of the present invention, there will be provided a single-use package of the type described by way of introduction with a tubular container body which is produced by fold-forming and sealing of the packaging laminate according to the invention.

The single-use package according to the present invention has surprisingly good grip rigidity and gripping properties and may conveniently be grasped and lifted with one hand grasping about the tubular container body practically without any excessive buckling of the container walls and consequentially accidental pouring out of the contents of the package when the package is emptied.

Panel and comparative tests which have been carried out have shown that a single-use package which is produced by fold-forming and sealing of a packaging laminate according to the present invention is, as regards its gripping properties, perceived as vastly superior to comparative single-use packages produced from prior art packaging laminates, i.e. packaging laminates without a layer of mineral-filled polyolefin. The results are particularly surprising, since at least one of the tested comparative packages was produced from a packaging laminate which had a higher flexural rigidity (higher inherent resistance to bending) than the packaging laminate according to the present invention and which could, therefore, be expected to impart to the produced comparative package a relatively better gripping rigidity and better gripping properties.

BRIEF DESCRIPTION OF THE DRAWINGS

Further advantages, characterising features and modifications of both the packaging laminate and the single-use package according to the present invention will be apparent from the following detailed description, with reference to the accompanying Drawings, in which.

DETAILED DESCRIPTION OF THE INVENTION

Figure 4:
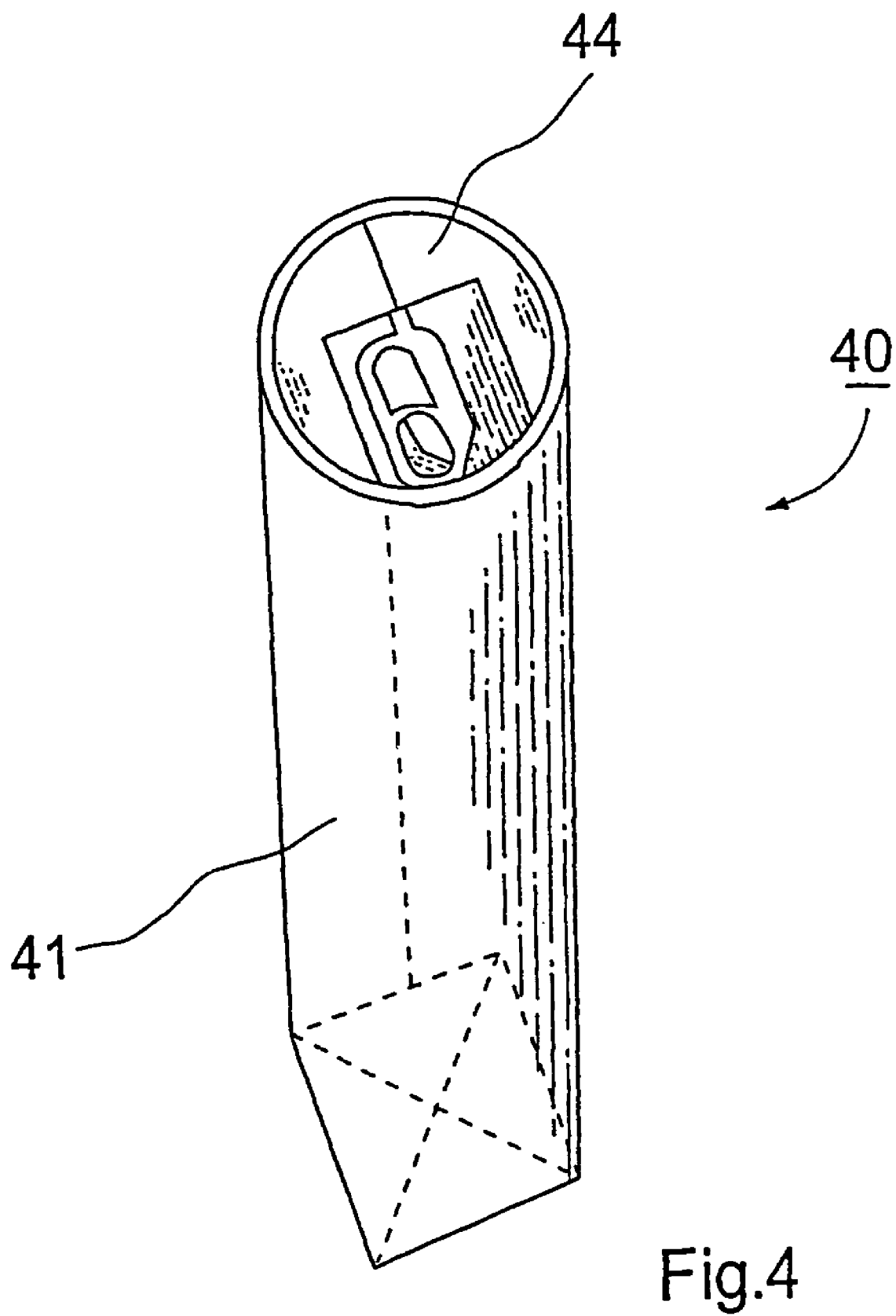

It should first be observed that the present invention is, naturally, not restricted exclusively to the embodiments of single-use packages shown on the Drawings which are merely intended to illuminate a number of examples of single-use packages where the present invention may be applicable. It will be obvious to a person skilled in the art that a multiplicity of different variations and modifications of both the packaging laminate in FIG. 1 and the single-use packages in FIGS. 2-4 are possible without departing from the inventive scope as this is defined in the appended Claims.

Figure 1:
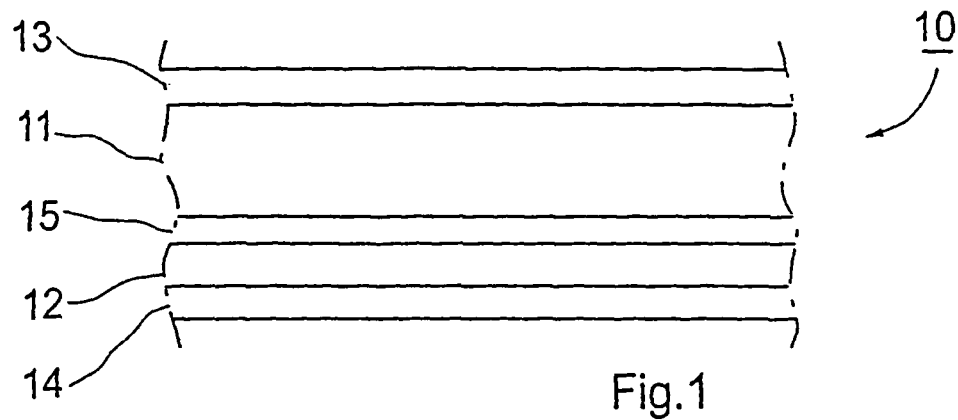
FIG. 1 schematically shows a cross section of a packaging laminate according to the present invention.
Figures 2, 3:
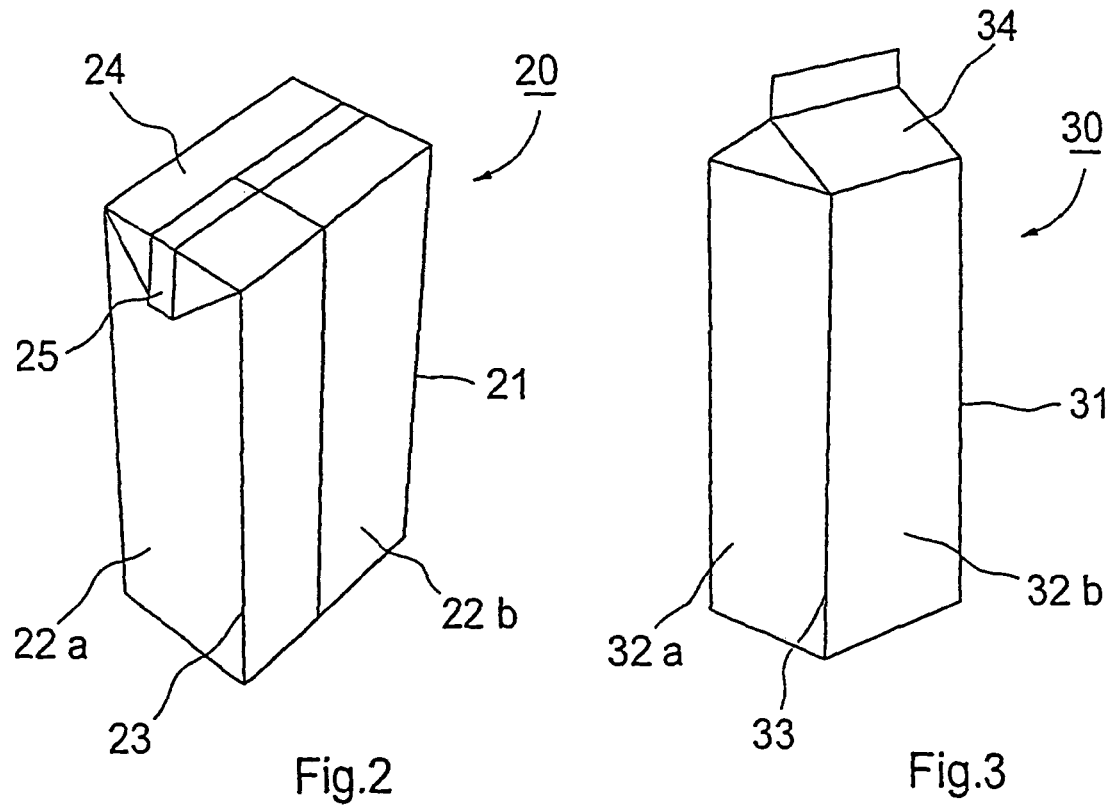
FIGS. 2-4 schematically illustrate single-use packages of conventional type, FIG. 2 showing a single-use package of the type sold under trademark Tetra Brik®, FIG. 3 showing a single-use package of the type sold under the trademark Tetra Rex®, and FIG. 4 showing a single-use package of the type sold under the trademark Tetra Top®.

FIG. 1 thus shows a simple, but practical embodiment of a packaging laminate for a single-use package possessing superior gripping properties. The packaging laminate 10 has a relatively thick, but foldable core layer 11 of paper or paperboard and a layer 12 of mineral-filled polyolefin applied for the purpose of increasing rigidity and in which the percentage weight proportion of mineral particles constitutes between approx. 40 and approx. 70% of the total weight of the mineral-filled polyolefin layer. In order to impart to the packaging laminate 10 the requisite or desirable tightness properties against liquids, the packaging laminate 10 moreover has outer, liquid-tight coatings 13 and 14 of polyolefin on both sides of the paper or paperboard layer 11.

The mineral-filled polyolefin layer 12 may be produced by an extrusion operation during which a film of molten polyolefin with admixed mineral particles is extruded against one side of a paper or paperboard web, at the same time as a film 15 of a suitable adhesive or binder is extruded between the molten, mineral-filled polyolefin film and the paper or paperboard web. Alternatively, the mineral-filled polyolefin layer 12 may be produced as a blown film by a film blowing operation and thereafter be laminated and permanently bonded to the paper or paperboard web with the aid of a suitable lamination or adhesive layer 15 by a simple lamination operation, which is well-known to a person skilled in the art. However, the mineral-filled polyolefin layer 12 is preferably produced as a poured film by an extrusion operation during which the film is first extruded on a cooled surface. Thereafter, the poured film is laminated to the paper or paperboard web by a lamination operation in a per se known manner.

The thickness of the mineral-filled polyolefin layer 12 may vary, depending int. al. on the size and configuration of the relevant single-use package, even though a mineral-filled polyolefin layer of a thickness within the range of approx. 30 to approx. 100 μm in general gives the packaging laminate 10 sufficient rigidity to make for the production of a single-use package with the sought-for improved gripping properties.

Examples of applicable polyolefins for the mineral-filled polyolefin layer 12 may, according to the invention, be based on both homopolymers and copolymers of ethylene and propylene. Examples of such homopolymers are a propylene homopolymer with a melt index according to ASTM of under 10 (2.16 kg; 230° C.), and examples of such copolymers of ethylene and propylene are an ethylene/ propylene copolymer with a melt index according to ASTM of 0.5-5 (2.16 kg; 230° C.).

Suitable mineral particles for employment in the mineral-filled polyolefin layer 12 may be any known mineral particles in this area whatever, but are preferably mineral particles selected from the group essentially comprising dolomite, chalk, calcium, talcum, mica, kaolin, clay and wollastonite (tabular spar). Further, the percentage weight proportion of the mineral particles in the mineral-filled polyolefin layer 12 may vary within broad limits, but is generally within the range of from approx. 40 to approx. 70% of the total weight of the mineral-filled polyolefin layer 12. Mineral particles in a weight proportion below the lower limit of 40% entail that the mineral-filled polyolefin layer 12 will be far too viscous to give the requisite rigidity to the packaging laminate 10, while mineral particles in weight proportions above the upper limit of 70% entail that the mineral-filled polyolefin layer 12 will be far too brittle to be able to be formed by fold-forming without the risk of crack formation. In order to give optimum rigidity and formability to the packaging laminate 10, the percentage weight proportion of the mineral particles should therefore lie within the disclosed range of from approx. 40 to approx. 70% of the total weight of the mineral-filled polyolefin layer 12.

A suitable polyolefin for the two outer, liquid-tight coatings 13 and 14 is polyethylene, preferably a low density polyethylene (LDPE), which, in addition to possessing superior tightness properties against liquids, also makes for the production of mechanically strong and liquid-tight sealing joints by a simple, but effective thermosealing during the reforming of the packaging laminate 10 into dimensionally stable, single-use packages possessing superior mechanical grip rigidity and improved gripping properties. Suitable thicknesses or coating quantities for the outer, liquid-tight polyolefin coatings 13 and 14 may, according to the present invention, vary, but generally lie within the range of approx. 10 to approx. 20 g/m² for the one outer coating 13 and within the range of approx. 20 to approx. 50 g/m² for the other outer coating 14.

From the illustrated packaging laminate 10 in FIG. 1, dimensionally stable, liquid-tight single-use packages are produced according to the invention of which a few well-known examples are shown in FIGS. 2-4.

FIG. 2 is a perspective view of a commercial single-use package of the type which is sold under the trademark Tetra Brik®. This single-use package 20 has a tubular container body 21 of substantially rectangular cross section, comprising four pairwise opposing side walls (of which only two adjacent side walls 22a and 22b are shown) which are united with one another along vertical folding or corner edges, such as the illustrated corner edge 23 between the two adjacent side walls 22a and 22b. The package 20 has further, substantially planar top and bottom closures in one piece with the tubular container body 21 (of which only the top closure 24 is shown) with four pairwise opposing, double-walled triangular corner flaps, such as the illustrated corner flap 25, which are folded in and permanently sealed against an adjacent planar wall surface on the outside of the package.

A single-use package of the type (Tetra Brik®) shown in FIG. 2 is produced from a web of the packaging laminate 10 in that both of the longitudinal edges of the web are folded towards and united to one another in a longitudinal overlap joint for the formation of a tube. The tube is filled with the relevant contents, e.g. milk or juice, and is divided into individual packaging units by repeated compression and thermosealing of the tube transversely of the longitudinal direction of the tube, at the same time as the packaging units are separated from one another by incisions in the transverse sealing zones for the formation of filled, cushion-shaped packages. In a subsequent forming and sealing operation, the cushion-shaped packages are thereafter given their final geometric configuration, normally parallelepipedic, at the same time as the four formed, pairwise opposing triangular corner flaps are folded in and permanently sealed to adjacent, planar wall surfaces on the outside of the package.

FIG. 3 is a perspective view of a commercial single-use package of the type which is sold under the trademark Tetra Rex®. This known single-use package 30 has a tubular container body 31 of substantially square cross section, comprising four pairwise opposing side walls (of which only two adjacent side walls 32a and 32b are shown) which are united with one another along vertical folding or corner edges, such as the illustrated corner edge 33 between the two adjacent side walls 31a and 31b. The package 30 has further, a substantially planar bottom closure (not shown) united in one piece with the container body 31 and a gable top upper closure 34 united in one piece with the tubular container body 31.

A single-use package of the type (Tetra Rex®) which is shown in FIG. 3 is produced from a tubular, flat-folded packaging blank of the packaging laminate 10 in FIG. 1 in that the packaging blank is first raised to an open, tubular container body of substantially square cross section. The one open end of the container body is closed by a fold-forming and sealing operation during which the four continuous, pairwise opposing end panels of the container body are folded in towards and sealed to one another for the formation of a substantially planar bottom closure. The thus closed container body is filled with the relevant contents, e.g. milk or juice, through the other open end of the container body which is thereafter closed by an additional fold-forming and sealing operation during which the four continuous, pairwise opposing end or top panels of the container body are folded towards and sealed to one another in such a manner that the package is given its characteristic gable top shaped upper closure.

FIG. 4 is a perspective view of a commercial single-use package of the type which is sold under the trademark Tetra Top®. This known, single-use package 40 has a tubular container body 41 of substantially circular cross section and a substantially planar bottom closure (not shown) united with the tubular container body 41. A single-use package of this type (Tetra Top®) differs from both of the previously described single-use packages 20 and 30 principally in that the tubular container body 41 practically totally lacks vertical fold- or corner edges and in that it has a separate upper closure in the form of an injection moulded plastic lid 44 with a peripheral, annular downwardly directed flange by means of which the plastic lid 44 is fixedly sealed to the inside of the cylindrical container body 41.

A single-use package of the Tetra Top® type is produced, like the single-use package of the Tetra Rex® type, from a tubular, flat-folded packaging blank of the packaging laminate 10 in FIG. 1 in that the tubular packaging blank is first raised for the formation of an open tubular container body of substantially circular cross section. The one open end of the container body is closed by an injection moulding operation during which molten plastic is injected against and formed into a circular, substantially planar lid with an annular, peripheral downwardly directed flange by means of which the injection moulded plastic lid is fixedly sealed to the inside of the container body. The thus closed container body is filled with the relevant contents, e.g. milk, through the other open end of the container body which is thereafter closed by a fold-forming and sealing operation during which the four continuous, pairwise opposing end or bottom panels of the container body are folded towards and sealed to one another at the same time as the two double-walled, triangular corner flaps formed by the folding operation are folded in and fixedly sealed to the planar bottom closure on the outside of the package.

The single-use packages 20, 30 and 40 according to the present invention are both dimensionally stable and liquid-tight, and, moreover, enjoy the major advantage over corresponding conventional single-use packages that, with a simple manual grip around at least a part of the tubular container body 21, 31 and 41 respectively, they may be lifted and emptied of their contents, almost totally without the risk of unnecessary spillage by an excessive inward buckling of the gripped package wall when the package is emptied. The improved gripping properties of the single-use packages according to the invention are particularly advantageous and desirable in, for example, single-use packages of the Tetra Tops type, i.e. single-use packages which have a tubular container body without longitudinal rigidifying corner or fold edges, where the problem addressed here has been particularly manifest and troublesome.

What is claimed is:

1. A packaging container, comprising:
   a tubular container body;
   an openable, injection moulded top closure; and
   a substantially planar bottom closure formed in one piece with the tubular container body;
   wherein at least a part of the tubular container body is produced from a packaging laminate comprising a core layer of paper or paperboard which has an inner side and an outer side; an extruded layer of mineral-filled polyolefin on the inner side of the core layer, the mineral-filled layer contains mineral particles in a quantity of between 40 and 70%, calculated on the total weight of the mineral-filled layer; and a first liquid-tight coating on the inner side of the core layer and forming an inner surface of the container body, wherein the tubular container body is without vertical rigidifying folding- or corner edges which extend all the way between the top closure and bottom closure wherein the mineral particles are selected from the group consisting of dolomite, chalk, calcium, talcum, mica, kaolin, clay and wollastonite.

2. The packaging container as claimed in claim 1, wherein the mineral-filled layer is bonded to the core layer by a lamination layer of polyolefin.

3. The packaging container as claimed in claim 1, wherein the mineral-filled layer has a propylene based base compound.

4. The packaging container as claimed in claim 1, wherein the container body has a substantially circular cross section.

5. The packaging container as claimed in claim 1, wherein:
   the bottom closure is fold formed and sealed; and
   the first liquid-tight coating is of polyolefin.

6. The packaging container as claimed in claim 5, further comprising a second liquid-tight coating of polyolefin on the outer side of the core layer.

7. The packaging container as claimed in claim 6, wherein the first and second coatings consist of polyethylene.

8. The packaging container as claimed in claim 5, wherein the tubular container body has a substantially circular cross section.

* * * * *